United States Patent
Mayberry et al.

(10) Patent No.: US 11,662,208 B2
(45) Date of Patent: May 30, 2023

(54) DEAD RECKONING CORRECTION UTILIZING PATTERNED LIGHT PROJECTION

(71) Applicant: Ford Global Technologies, LLC, Dearborn, MI (US)

(72) Inventors: Scott Mayberry, East Point, GA (US); David Berels, Plymouth, MI (US); Mahmoud Yousef Ghannam, Canton, MI (US); Rajarshi Roychowdhury, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 281 days.

(21) Appl. No.: 17/064,060

(22) Filed: Oct. 6, 2020

(65) Prior Publication Data

US 2022/0107183 A1 Apr. 7, 2022

(51) Int. Cl.
*G01C 21/16* (2006.01)
*G05D 1/10* (2006.01)
*B64C 39/02* (2023.01)
*B64D 47/02* (2006.01)
*G08G 5/00* (2006.01)

(52) U.S. Cl.
CPC .......... *G01C 21/188* (2020.08); *B64C 39/024* (2013.01); *B64D 47/02* (2013.01); *G01C 21/165* (2013.01); *G05D 1/101* (2013.01); *G08G 5/0069* (2013.01); *B64D 2203/00* (2013.01); *B64U 2201/00* (2023.01)

(58) Field of Classification Search
CPC .. G01C 21/188; G01C 21/165; B64C 39/024; B64C 2201/14; B64D 47/02; B64D 2203/00; G05D 1/101; G08G 5/0069
See application file for complete search history.

(56) References Cited

U.S. PATENT DOCUMENTS

| 7,177,737 B2 | 2/2007 | Karlsson et al. |
| 8,649,565 B1 | 2/2014 | Kim et al. |
| 2017/0031369 A1* | 2/2017 | Liu ............ G06K 7/1417 |
| 2017/0199024 A1* | 7/2017 | Georgeson ............ G01S 5/16 |

OTHER PUBLICATIONS

Roston et al., "Dead Reckoning Navigation for Walking Robots", The Robotics Institute, Carnegie Mellon University, Pennsylvania, Nov. 1991 (23 pages).

* cited by examiner

*Primary Examiner* — Peter D Nolan
*Assistant Examiner* — Roy Rhee
(74) *Attorney, Agent, or Firm* — Brandon Hicks; Eversheds Sutherland (US) LLP

(57) ABSTRACT

Dead reckoning correction utilizing patterned light projection is provided herein. An example method can include navigating a drone along a pattern using dead reckoning, the pattern having a plurality of lines, detecting one of the plurality of lines using an optical sensor of the drone, determining when a line of travel of the drone is not aligned with the one of the plurality of lines, and realigning the line of travel of the drone so as to be aligned with the one of the plurality of lines to compensate for drift that occurs during navigation using dead reckoning.

20 Claims, 4 Drawing Sheets

DEAD RECKONING CORRECTION UTILIZING PATTERNED LIGHT PROJECTION

BACKGROUND

Drones and other robots may rely on accelerometers for motion sensing and position detection. For example, a drone may be configured to double integrate a signal output of an accelerometer to determine position. This method of position tracking is called dead reckoning. Dead reckoning, however, becomes less accurate over time. Small errors/noise in the accelerometers original measurement may be multiplied through the double integration, and the measured position becomes less and less accurate over time. For drones, utilizing dead reckoning as a navigation method can quickly become untenable.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is generally directed to systems and methods for dead reckoning correction in drone applications using projected light patterns. These systems and methods can be used to decrease the drift of a drone caused by the inherent limitations of an inertial measurement unit (IMU)/accelerometer or remove it entirely. The systems and methods can be configured to interact with a drone's navigation system by taking advantage of the drone's need to correct for drift. As used herein, a drone may refer to a wheeled robot or an unmanned aerial vehicle (UAV).

In some instances, a drone can include various sensors such as a gyroscope that measures angular velocity, an accelerometer that measures acceleration forces, and a magnetometer that measures the Earth's magnetic field. For context, accelerometers and magnetometers do not experience drift over time but can have an absolute error. Gyroscopes may drift over time but are more precise in their measurements. An IMU of the present disclosure can achieve high precision measurements by sensor synthesis. While accelerometers are slow in their measurement capabilities, over time an accelerometer can sense where gravity is pointing. By combining this slow but precise ground reference position to the gyroscope's fast but less accurate angular velocity position, the angle of the IMU can be determined to a high degree of precision. By utilizing the same method of sensor synthesis and the magnetometer's slow but precise knowledge of where magnetic north is located, the gyroscope can also reference its yaw position. Utilizing all three of these sensors in combination allows an IMU to determine its absolute angle relatively fast and with high accuracy.

Illustrative Embodiments

Figure 1:
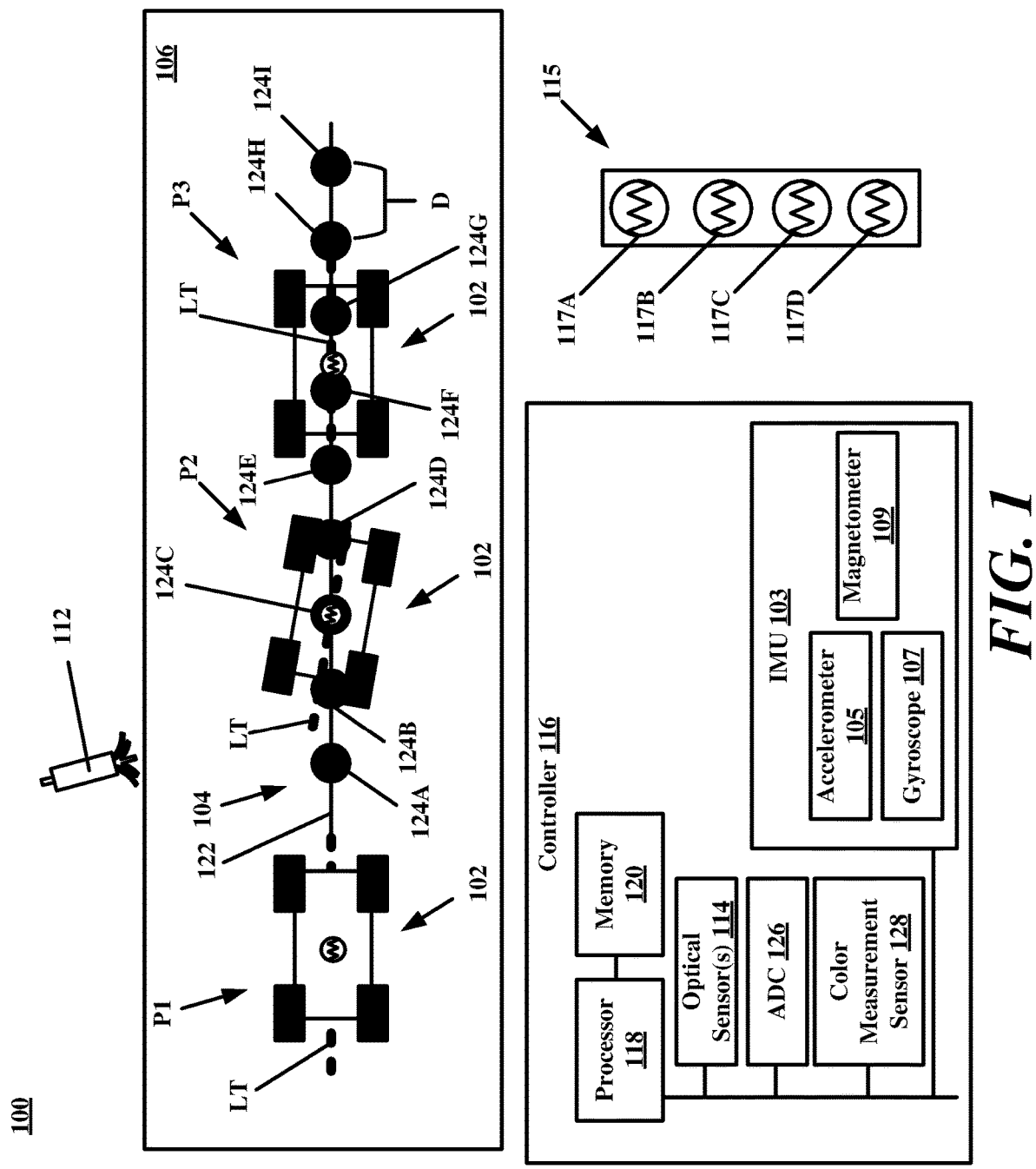
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The architecture 100 can comprise a drone 102, which can include an ambulatory or walking drone. The drone 102 could be configured to operate in a warehouse or manufacturing floor, as examples. An example drone 102 could include an autonomous device capable of remote sensing, image capturing, applying markings/indicia—just to name a few. The drone 102 could include a small drone or MARV (Miniature Autonomous Robotic Vehicles). The present disclosure can also be applied to drones such as autonomous package moving drones in a warehouse. The drone 102 can be equipped with an IMU 103 that comprises an accelerometer 105, a gyroscope 107, and a magnetometer 109.

The drone 102 can be configured to follow a projected line emitted by a light source 112. The light source 112 could include a device that emits laser light or a light-emitting diode (LED). To be sure, any device capable of emitting radiation on the light spectrum can be used as the light source 112 so long as an optical sensor(s) of the drone 102 is/are capable of sensing the light pattern emitted by the light source 112. The light source 112 could be mounted on a machine such as a robotic arm, allowing for dynamic projection across complex geometry. The projected patterns created by the light source can be utilized to control a group of small drones or MARVS. These small drones can reach positions an articulating robotic arm cannot. In one use case, placing the light source 112 on a robotic arm can allow light to be projected into hard-to-reach places allowing small drones/MARVS to continue their task(s).

Thus, the drone 102 can also comprise one or more optical sensor(s) 114. The optical sensor(s) 114 could include one or more photoresistors, as an example. The drone 102 can rely on information gathered from a plurality of photoresistors for purposes of position/orientation correction as will be discussed in greater detail infra. The type of optical sensor(s) included on the drone 102 can be chosen based on the light type emitted by the light source 112.

The drone 102 can be configured to follow a projected pattern 104 emitted the light source 112. The projected pattern 104 could be placed on any target surface 106 of interest. In general, drone 102 may be controlled in its direction of travel based on feedback from the optical sensor(s) 114, as determined by a controller 116. The controller 116 can comprise a processor 118 and memory 120. The memory 120 can store executable instructions or logic that allows the drone 102 to determine and correct its orientation during travel. As noted above, this orientation correction is helpful in situations when the drone 102 is using dead reckoning for navigation.

While following the projected pattern 104, the drone 102 may determine that it is aligned with the projected pattern 104 or not. As noted above, if using dead reckoning for positioning, the drone 102 may quickly lose its location. The drone 102 may only know that it is on the projected pattern 104. However, the use of the projected pattern 104 for alignment/orientation correction can allow for improved dead reckoning navigation.

Some configurations allow for embedding of information into the projected pattern 104. For example, the projected pattern 104 includes a line 122 having a plurality of fiduciary objects 124A-124I. A projected pattern can have fewer or more fiduciary objects as needed. The fiduciary objects 124A-124I can each have a particular geometrical configuration such as circular, bulbous, but other geometrical shapes can be used. In some cases, the fiduciary objects can be spaced a certain distance D apart (one millimeter, one centimeter, etc.). As the drone 102 traverses the projected pattern 104 along a line of travel $L_T$, the controller 116 can reset the orientation/position of the drone 102 as it senses one or more of the fiduciary objects 124A-124I. As the drone 102 passes over each of the fiduciary objects 124A-124I, the projected light pattern is sensed by the optical sensor(s) 114. Signals that are generated by the optical sensor(s) 114 may be passed to the controller 116. The controller 116 may receive the signals from the optical sensor(s) 114 and use the same to measure changes in light intensity. In some instances, multiple optical sensors can be placed in a linear pattern on the drone 102 and may sense changes in light intensity as each interact with the fiduciary objects 124A-124I.

In some instances, a projected pattern can include a linear pattern projected in both the X and Y directions. Assuming that the optical sensor(s) 114 includes a 3×3 array of optical/color sensors, the controller 116 can extrapolate an exact or approximate angle of a line based on readings from each sensor in two example methods. In a first process, the controller 116 can read whether each sensor is sensing a line or not, which can be used to determine an angle of incidence with the line. If the lines include a color gradient, the controller 116 can determine an exact position and angle of the MARV in the X-Y plane.

In more detail, the drone 102 is traversing along the line 122 in position P1 where the line of travel $L_T$ of the drone 102 is substantially aligned with the line 122. In position P2, the drone 102 has drifted in its position such that the line of travel $L_T$ is no longer aligned with the line 122. When the drone 102 encounters one of the fiduciary objects, such as fiduciary object 124C, the drone 102 can realign with the line 122 so that the line of travel $L_T$ of the drone 102 is substantially aligned with the line 122 again as illustrated in position P3. Another example optical sensor bar 115 with a plurality of elements 117A-117D are illustrate as well.

Figure 2:
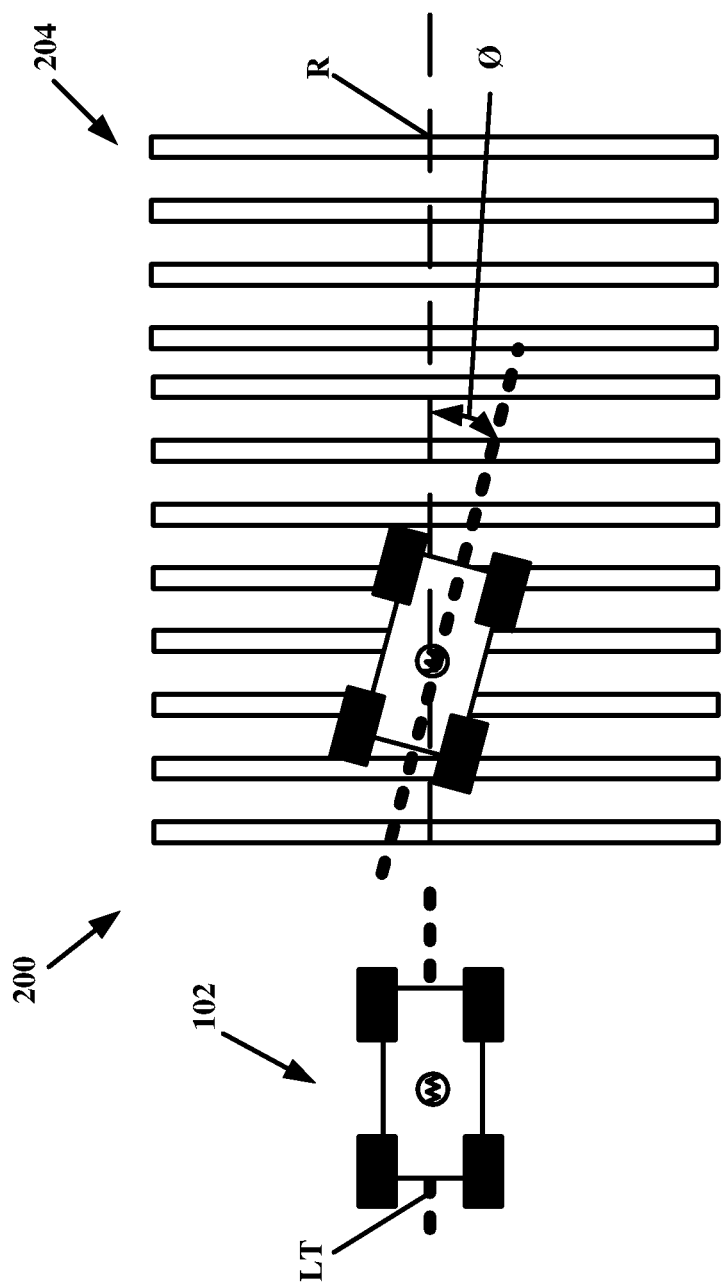
FIG. 2 depicts interaction of a drone with a projected pattern, illustrating the realignment of the drone using the projected pattern.

FIG. 2 illustrates another example of a projected pattern 200 that can be used to accomplish dead reckoning correction in accordance with the present disclosure. In general, the projected pattern 200 includes a plurality of lines 204 of equivalent length and width. Spacing between adjacent lines can be used to indicate a distance. When operating in an intended manner, the drone can travel perpendicularly along the line of travel $L_T$ that is perpendicular to the plurality of lines 204 of the projected pattern 200.

The plurality of lines 204 provide both a direction to travel and a precision measurement of location. A controller of a drone can calculate an angle of incidence Ø as the drone interacts (e.g., optical sensors light sensing of projected light) with the plurality of lines 204. The angle of incidence Ø is indicative of a deviation by the drone 102 and its line of travel $L_T$ relative to the plurality of lines 204. The angle of incidence Ø can be measured relative to a reference line R that is perpendicular to the plurality of lines 204. When the angle of incidence Ø is zero the line of travel $L_T$ is perpendicular to a line of the plurality of lines 204. If the drone begins to drift, the angle of incidence Ø may begin to have a value. As noted above, this drift may be due to inaccuracies with operations of the IMU 103 (see FIG. 1). The controller of the drone can cause the drone to travel perpendicular to the plurality of lines 204 by compensating for the angle of incidence Ø to reduce it the angle of incidence Ø to approximately or approximately zero.

Figure 3:
FIG. 3 illustrates an example projected pattern in the form of a gradient line.

FIG. 3 illustrates another example of a projected pattern 300 that includes a gradient. The gradient can involve a change in hue, a change in contrast or brightness along the projected pattern 300, or another similar gradient that can be measured. Referring briefly to FIGS. 1 and 3 collectively, the controller 116 of the drone 102 can comprise an analog-to-digital (ADC) convertor 126 with one or more color measurement sensor 128 to identify the location of the drone 102 along the projected pattern 300. A strongest blue section 302 at a terminal end of the projected pattern 300 could represent a distance value of zero millimeters and a strongest red section 304 at an opposing terminal end of the projected pattern 300 could indicate when the drone has traversed the projected pattern 300 to a final distance of five hundred millimeters. A color gradient between these terminal endpoints of the projected pattern 300 may represent a value between the maximum (strongest red section 304) and minimum (strongest blue section 302).

Figure 4:
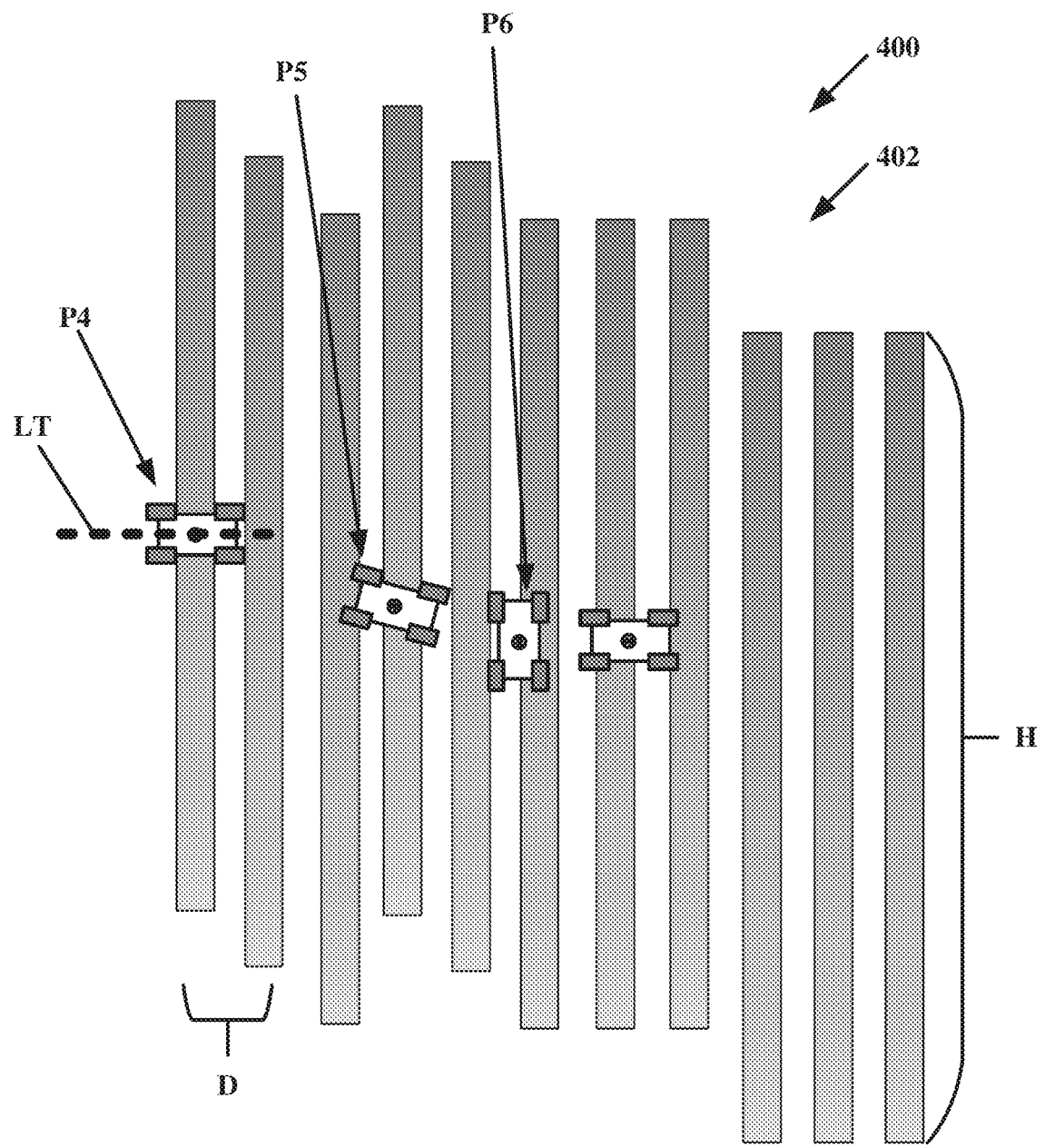
FIG. 4 depicts interaction of a drone with a projected pattern of staggered/jagged lines, illustrating realignment of the drone using the projected pattern.

FIG. 4 illustrates another example a projected pattern 400 that can be used to accomplish dead reckoning correction in accordance with the present disclosure. The projected pattern 400 includes a plurality of lines 402 that can be oriented perpendicularly to a line of travel $L_T$ along which a drone can traverse. Adjacent ones of the plurality of lines 402 can be spaced apart to define a distance measurement D. Each of the plurality of lines 402 can also comprise a height value H. Further, each of the plurality of lines 402 can have a gradient that is similar to the gradient of the projected pattern 300 of FIG. 3. This gradient allows the drone to travel in two axes rather than a single axis where the drone would travel perpendicularly to the plurality of lines 402, as with the projected pattern 200 of FIG. 2. That is, more dead reckoning corrective information can be embedded in this line compared to the projected pattern of FIGS. 1-3.

For example, a controller of a drone can determine where the drone encounters one of the plurality of lines 402 by utilizing a color sensor. For example, a relative height H can be determined. By knowing that each line is D distance apart, the drone can determine its absolute position. Further, the drone can determine an angle of travel by comparing the previous color of an encountered one of the plurality of lines 402 to a subsequently encountered one of the plurality of lines 402, and calculate a deviation angle (e.g., angle of incidence) that can be used to reach the next line.

The drone can determine its position along a dimension of the line (for example along its height H) by determining a mixture of colors in the two-tone color gradient of a line. If the controller determines that a line being sensed is becoming bluer, the controller of the drone can change the angle of the direction of travel of the drone more clockwise. For example, if the drone operates using wheels, the controller could steer the wheels of the drone in accordance with the angle of the direction of travel as needed. That is, the controller of the drone can align the drone with a specified location associated with a color mixture of the two-tone color gradient of a line. This can repeatedly occur as the drone moves across one line to another.

In one use case, the controller can determine a sensed color of a two-tone color gradient of a line as sensed by a color sensor. The controller can then change the line of travel of the drone by comparing the color with an alignment color selected for the drone. This could include turning the drone ninety degrees as noted above. That is, the controller can navigate the drone along the line until the sensed color matches the alignment color.

Conversely, if the controller determines that the line is becoming redder, the controller of the drone can alter the angle of the line of travel $L_T$ of the drone more counterclockwise relative to the line. If the recognized (sensed) color is too red or too blue, the controller of the drone could pause drone movement along the projected pattern 400, cause the drone to turn 90 degrees, and traverse along the projected pattern 400 until the controller senses that the color sensor signals indicate that the color is approximately a middle shade between red and blue (or whatever the two colors used were). The controller can cause the drone to return to a perpendicular orientation (e.g., line of travel $L_T$ relative to a line) and travel relative to the projected pattern 400 and continue on its path.

In an example use case, the drone 102 is traveling along the line of travel $L_T$ at position P4. This alignment is matched to a specific color match position on one of the lines. The drone begins to drift at position P5. To realign the drone, when the drone 102 reaches a next line of the plurality of lines 402 at position P6, the controller can cause the drone 102 to turn ninety degrees and move upwardly until the color sensor reaches the selected color match noted above. The drone may continue its travel to subsequent lines after being turned again ninety degrees so as to be perpendicular to the plurality of lines 402. The drone 102 may traverse itself along this jagged pattern made from the plurality of lines 402. This can allow the drone 102 to follow an irregular path of travel.

In an example use case, the drone 102 is configured to align itself with a color mixture ratio of 54:46, blue to red. The drone 102 can be configured to traverse across the plurality of lines 402 by determining if the color sensor is reading a color mixture of the specified ratio. If not, the controller of the drone 102 can cause the drone 102 to walk up or down the line until it locates the color mixture ratio point on the line of 54:46. The controller of the drone 102 can then cause the drone to orient itself perpendicularly to the line and proceed to an adjacent line. The color sensing process occurs at the next line and the drone 102 can reorient itself if it is not sensing the specified color mixture ratio point. This may occur because the drone drifted or because the lines were offset from one another. In some configurations, the controller of the drone 102 could be configured to walk to a unique color mixture ratio point on each line so as to traverse an irregular, rather than linear path across the plurality of lines 402.

To be sure projected dynamic lines used to embed location information can be advantageous in many use cases. For example, when considering controlling a swarm of drones, a miscommunication or a break in communication can lead to deleterious effects such as drone collision, failure to complete task, and so forth. The projected laser line systems and methods disclosed herein provide an effective means of location management of a swarm of drones while being able to also provide a back-up system if communication protocols fail. When directing the actions of MARVs, many projected patterns can be used. For example, each MARV can be directed using a unique projected pattern. The projected light patterns may be different for each MARV is the swarm. The MARVs can be configured to respond/follow a particular color or frequency.

Figure 5:
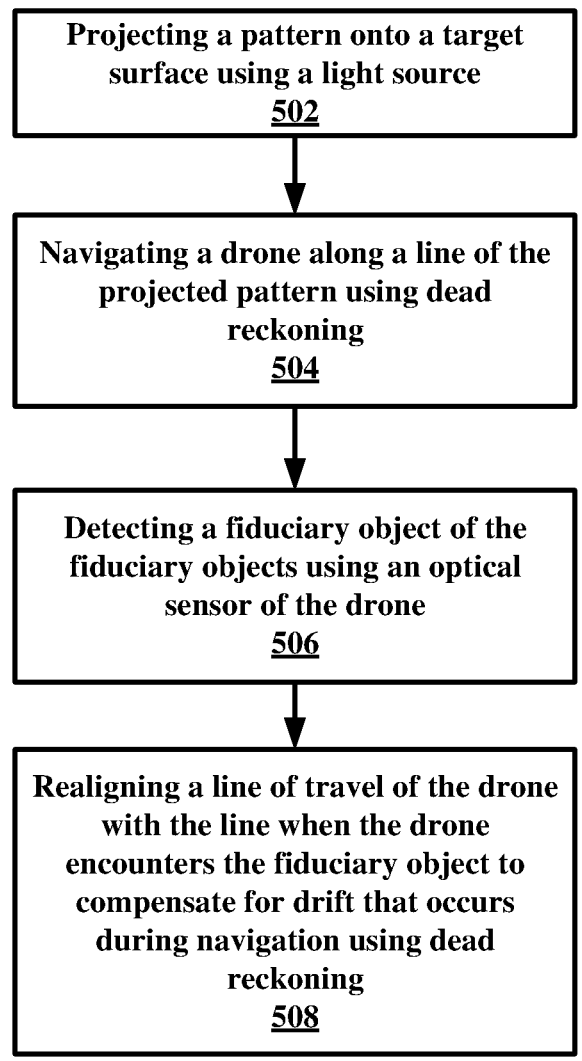
FIG. 5 is a flowchart of another example method of the present disclosure.

FIG. 5 is a flowchart of an example method of the present disclosure. The method can include a step 502 of projecting a pattern onto a target surface using a light source. To be sure, the pattern comprises a line comprising a series of fiduciary objects. The fiduciary objects could include circular bulbs or other geometrical patterns. These fiduciary objects can be sensed by one or more optical sensors of a drone.

The method can include a step 504 of navigating a drone along the line using dead reckoning. During dead reckoning navigation and movement of the drone, the method can include a step 506 of detecting a fiduciary object of the fiduciary objects using an optical sensor of the drone. This can be accomplished using one or more optical sensors mounted on the drone. The method can include a step 508 of realigning a line of travel of the drone with the line when the drone encounters the fiduciary object to compensate for drift that occurs during navigation using dead reckoning.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A method, comprising:
   projecting a pattern onto a target surface using a light source, the pattern comprising a line comprising a series of fiduciary objects;
   navigating a drone along the line using dead reckoning, wherein the drone comprises an array of optical sensors, the array of optical sensors comprising a first subset of optical sensors and a second subset of optical sensors;
   determining that both a first sensor of the first subset of optical sensors and a second sensor of the second subset of optical sensors detect a fiduciary object of the series of fiduciary objects;
   determining, based on the determination that both the first sensor and the second sensor detect the fiduciary object, that a first line of travel of the drone is unaligned with the line; and
   causing the drone to adjust to a second line of travel that is aligned with the line to compensate for drift that occurs during navigation using dead reckoning.

2. The method according to claim 1, wherein the drone is navigated using dead reckoning through an inertial measurement unit.

3. The method of claim 1, further comprising:
   determining, subsequent to the drone adjusting to the second line of travel, that the first sensor detects the fiduciary object instead of the second sensor; and
   causing the drone to maintain the second line of travel that is aligned with the line.

4. The method of claim 1, wherein an arrangement of the first subset of optical sensors and the second subset of optical sensors is fixed, and wherein the second subset of optical sensors are positioned further from a center point of the array of optical sensors than the first subset of optical sensors.

5. A method, comprising:
   navigating a drone along a pattern using dead reckoning, the pattern comprising a plurality of lines;
   detecting a first line of the plurality of lines using an optical sensor of the drone, wherein the first line comprises a two-tone color gradient, and wherein the two-tone color gradient comprises a sensed color mixture ratio that includes a first color at a first terminal end of the first line, a second color at a second terminal end of the first line, and gradually transitions from the first color to the second color from the first terminal end to the second terminal end;
   determining a position of the drone relative to the first terminal end and the second terminal end of the first line based on the sensed color mixture ratio;
   determining, based on the position, that a line of travel of the drone is unaligned with the first line; and
   realigning the line of travel of the drone so as to be aligned with the first line to compensate for drift that occurs during navigation using dead reckoning.

6. The method according to claim 5, further comprising projecting the pattern onto a target surface using a light source, wherein the plurality of lines are equally spaced relative to one another.

7. The method according to claim 5, wherein determining when a line of travel of the drone is not aligned with the plurality of lines comprises determining when the line of travel of the drone creates an angle of incidence with a reference line that is perpendicular to the plurality of lines.

8. The method according to claim 7, wherein realigning the line of travel of the drone so as to be perpendicular with the plurality of lines comprises reducing the angle of incidence to zero or approximately zero.

9. The method according to claim 5, wherein the first color of the two-tone color gradient being indicative of a minimum value at the first terminal end of each line of the plurality of lines and the second color of the two-tone color gradient being indicative of a maximum value at the second terminal end of each line of the plurality of lines.

10. The method according to claim 9, wherein the minimum value and the maximum value represent different distances along a dimension of each line of the plurality of lines.

11. The method according to claim 9, wherein the plurality of lines are arranged into a staggered or jagged pattern.

12. The method according to claim 11, wherein determining when a line of travel of the drone is not aligned by:
determining a sensed color mixture ratio of the two-tone color gradient of each line of the plurality of lines sensed by a color sensor;
changing the line of travel of the drone by comparing the sensed color mixture ratio with an alignment color mixture ratio selected for the drone; and
navigating the drone along each line of the plurality of lines until the sensed color mixture ratio matches the alignment color mixture ratio.

13. The method according to claim 12, further comprising determining when the sensed color mixture ratio changes between two adjacent lines of the plurality of lines.

14. A device, comprising:
a processor; and
a memory for storing instructions, the processor executes the instructions to:
navigate a drone along a pattern using dead reckoning, the pattern comprising a plurality of lines;
detect a first line of the plurality of lines using an optical sensor of the drone, wherein the first line comprises a two-tone color gradient, and wherein the two-tone color gradient comprises a sensed color mixture ratio that includes a first color at a first terminal end of the first line, a second color at a second terminal end of the first line, and gradually transitions from the first color to the second color from the first terminal end to the second terminal end;
determine a position of the drone relative to the first terminal end and the second terminal end of the first line based on the sensed color mixture ratio;
determine, based on the position, that a line of travel of the drone is unaligned with the first line; and
realign the line of travel of the drone so as to be aligned with the first line to compensate for drift that occurs during navigation using dead reckoning.

15. The device according to claim 14, further comprising a light source that projects the pattern onto a target surface.

16. The device according to claim 14, wherein the processor is configured to determine when a line of travel of the drone creates an angle of incidence with a reference line that is perpendicular to the first line of the plurality of lines.

17. The device according to claim 16, wherein the processor is configured to reduce the angle of incidence to zero or approximately zero.

18. The device according to claim 14, wherein the first color of the two-tone color gradient being indicative of a minimum value at the first terminal end and the second color of the two-tone color gradient being indicative of a maximum value at the second terminal end.

19. The device according to claim 18, wherein the plurality of lines are arranged into a staggered or jagged pattern.

20. The device according to claim 19, wherein the processor is configured to:
determine a sensed color mixture ratio of the two-tone color gradient of one of the plurality of lines by a color sensor;
change the line of travel of the drone by comparing the sensed color mixture ratio with an alignment color mixture ratio selected for the drone; and
navigate the drone along the one of the plurality of lines until the sensed color mixture ratio matches the alignment color mixture ratio.

* * * * *